(12) United States Patent
Tiihonen et al.

(10) Patent No.: US 11,292,725 B2
(45) Date of Patent: Apr. 5, 2022

(54) METHOD FOR RECOVERING LITHIUM HYDROXIDE

(71) Applicant: OUTOTEC (FINLAND) OY, Espoo (FI)

(72) Inventors: Marika Tiihonen, Espoo (FI); Liisa Haavanlammi, Espoo (FI); Eero Kolehmainen, Pori (FI); Sami Kinnunen, Pori (FI); Juho Savikangas, Pori (FI)

(73) Assignee: METSO OUTOTEC FINLAND OY, Tampere (FI)

( * ) Notice: Subject to any disclaimer, the term of this patent is extended or adjusted under 35 U.S.C. 154(b) by 0 days.

(21) Appl. No.: 16/951,066

(22) Filed: Nov. 18, 2020

(65) Prior Publication Data

US 2021/0070622 A1 Mar. 11, 2021

Related U.S. Application Data

(63) Continuation of application No. PCT/IF2019/050275, filed on Apr. 5, 2019.

(30) Foreign Application Priority Data

May 18, 2018 (WO) .................. PCT/FI2018/050377

(51) Int. Cl.
*C01D 15/02* (2006.01)
*B01D 61/58* (2006.01)
*B01J 39/16* (2017.01)

(52) U.S. Cl.
CPC ............. *C01D 15/02* (2013.01); *B01D 61/58* (2013.01); *B01J 39/16* (2013.01)

(58) Field of Classification Search
CPC ......... C01D 15/02; B01D 61/58; B01D 39/16
See application file for complete search history.

(56) References Cited

U.S. PATENT DOCUMENTS 3,073,673 A 1/1963 Chubb
3,343,910 A 9/1967 Archambault et al.

FOREIGN PATENT DOCUMENTS

CA 2822196 A1 6/2012
CN 1109104 A 9/1995
(Continued)

OTHER PUBLICATIONS

Ya Chen et al: "Preparation of Lithium Carbonate From Spodumene by a Sodium Carbonate Autoclave Process", Hydrometallurgy, Elsevier Scientific Publishing CY. Amsterdam, NL, vol. 109, No. 1, May 14, 2011 (May 14, 2011), pp. 43-46, XP028267179, ISSN: 0304-386X, DOI: 10.1016/J.HYDROMET.2011.05.006 [retrieved on May 20, 2011] the whole document.

(Continued)

*Primary Examiner* — James A Fiorito
(74) *Attorney, Agent, or Firm* — Robert P. Michal, Esq.; Carter, DeLuca & Farrell LLP

(57) ABSTRACT

A method and arrangement for recovering lithium hydroxide from a mineral containing lithium, by pulping the raw material containing lithium in the presence of water and an alkali metal carbonate, leaching the obtained slurry twice, first at an elevated temperature, and secondly in an aqueous solution containing an alkali earth metal hydroxide, separating the thus obtained slurry into solids and a solution containing lithium hydroxide, the latter being purified, whereby lithium hydroxide monohydrate can be recovered from the purified solution by crystallising, and finally separating the solution obtained during the crystallization from the process and recycling it to one or more of the previous process steps.

18 Claims, 5 Drawing Sheets

(56) References Cited

FOREIGN PATENT DOCUMENTS

| | | |
|---|---|---|
| CN | 1214981 C | 8/2005 |
| CN | 100455512 C | 1/2009 |
| CN | 102115101 A | 7/2011 |

OTHER PUBLICATIONS

International Search Report issued by the European Patent Office acting as the International Searching Authority in relation to International Application No. PCT/FI2019/050275 dated Jul. 12, 2019 (4 pages).
Written Opinion of the International Searching Authority issued by the European Patent Office acting as the International Searching Authority in relation to International Application No. PCT/FI2019/050275 dated Jul. 12, 2019 (5 pages).
International Preliminary Report on Patentability issued by the European Patent Office acting as the International Preliminary Examining Authority in relation to International Application No. PCT/FI2019/050275 dated Sep. 8, 2020 (5 pages).
Choubey P. K. et al. Advance review on the exploitation of the prominent energy-storage element: Lithium. Part I: From mineral and brine resources. In: Minerals Engineering Oxford, GB: Elsevier Ltd., Jan. 28, 2016, vol. 89, pp. 119-137, ISSN 0892-6875, section 2.5 Existing commercial process for lithium recovery from minerals; section 3.2 Pre-concentration/pre-treatment; figures 10,15.
International Search Report issued by the Finnish Patent and Registration Office acting as the International Searching Authority in relation to International Application No. PCT/FI2018/050377 dated Aug. 30, 2018 (6 pages).

METHOD FOR RECOVERING LITHIUM HYDROXIDE

CROSS-REFERENCE TO RELATED APPLICATIONS

This application is a continuation of PCT International Application No. PCT/FI2019/050275 filed Apr. 5, 2019, which claims priority to International Application No. PCT/FI2018/050377, filed May 18, 2018, the disclosure of each of these applications is expressly incorporated herein by reference in their entirety.

FIELD OF THE INVENTION

The present invention relates to a method and an arrangement for recovering lithium hydroxide.

BACKGROUND OF THE INVENTION

CN102115101 discloses a method for producing lithium carbonate from spodumene mineral by performing a sulfuric acid treatment in order to obtain lithium sulfate, followed by a step of preparing the lithium carbonate mother liquor, from which the carbonate product can be separated, and finally the lithium hydroxide is obtained from the mother liquor by adding lime to causticize said mother liquor. Also barium hydroxide is said to be useful as a causticizing hydroxide.

CN 100455512 C discloses a process for preparing lithium hydroxide monohydrate by adding sodium hydroxide to a lithium sulfate solution in order to obtain liquid lithium hydroxide, followed by cooling, filtering and separating the lithium hydroxide from the sodium sulfate, whereafter a series of recrystallization steps are performed to provide the pure lithium hydroxide monohydrate.

In CN 1214981 C a similar process is described, wherein the step of adding sodium hydroxide into the lithium sulfate solution is carried out, followed by cooling and separating to obtain the liquid lithium hydroxide. The lithium hydroxide solution is then concentrated and crystallized, whereby a coarse lithium hydroxide monohydrate product can be separated. In this publication the pure lithium hydroxide monohydrate is obtained by reacting the coarse product with barium hydroxide, followed by concentrating and crystallizing.

However, these processes all proceed via the lithium sulfate.

BRIEF DESCRIPTION OF THE INVENTION

An object of the present invention is thus to provide a method and an arrangement for recovering lithium hydroxide with high yield and high purity, typically of battery grade, without the need for multiple purification steps.

Particularly, it is an object of the invention to provide a method and an arrangement for recovering lithium hydroxide with high yield and high purity, typically of battery grade, using simple purification steps and recirculations.

Battery grade lithium hydroxide herein means lithium hydroxide monohydrate crystals having a purity of 56.5%, or higher of lithium hydroxide.

In addition, the process concept is sulphate and acid free, without the formation of undesired crystallized byproducts. The objects of the invention are achieved by a method and an arrangement which is characterized by what is stated in the independent claims. The preferred embodiments of the invention are disclosed in the dependent claims.

The present invention relates to a method for recovering lithium hydroxide from a raw material containing lithium. The method comprises the following steps of
- pulping the raw material containing lithium in the presence of water and an alkali metal carbonate for producing a first slurry containing lithium,
- leaching the first slurry containing lithium in a first leaching step at an elevated temperature for producing a second slurry containing lithium carbonate,
- leaching the second slurry or a fraction thereof in a second leaching step in an aqueous solution containing an alkali earth metal hydroxide for producing a third slurry containing lithium hydroxide,
- separating the third slurry into solids and a solution containing lithium hydroxide by solid-liquid separation and providing a purified solution containing lithium hydroxide, and
- recovering lithium hydroxide monohydrate by crystallising from the purified solution containing lithium hydroxide.

Preferably, the method further comprises the steps of
- purifying the solution separated from the solids of the third slurry in a separate purification step, and
- separating the solution obtained during the crystallization from the process, and recycling it to one or more of the previous process steps, or back to the crystallization According to an embodiment of the present invention the raw material containing lithium can be any raw material from which it is desired to recover lithium. Typically the raw material containing lithium is selected from a mineral containing lithium, preferably from spodumene, petalite or lepidolite or mixtures thereof, most suitably from spodumene.

According to an embodiment of the present invention the raw material containing lithium is selected from a mineral containing lithium which has undergone heat treatment, whereby a particularly preferred material is beta-spodumene.

According to an embodiment of the present invention the first leaching solution is separated from the solids after the first leaching step, whereby only the solids are carried to the second leaching step.

According to an embodiment of the present invention the first leaching solution is separated from the solids after the first leaching step and is recycled either to the pulping step or to the first leaching step, or a fraction to each.

According to an embodiment of the present invention the solids are separated from the solution in the separation step by any suitable solid-liquid separation method, typically by thickening and/or filtering.

According to an embodiment of the present invention the purifying step carried out on the solution obtained from the second solid/liquid separation step, is preferably performed by ion exchange, typically by using cation exchange resin.

According to an embodiment of the present invention the crystallising of the lithium hydroxide monohydrate is performed by heating and cooling, or alternatively by merely concentrating the solution by heating.

According to an embodiment of the present invention the bleed solution obtained while crystallizing the lithium hydroxide monohydrate is recovered and recycled to one or more of the previous process steps, for example the pulping step, the second leaching step, a separation step, and/or back to the crystallization step.

Optionally, the bleed solution obtained from the crystallization step is pretreated prior to recycling it to previous process steps, e.g. by carbonation, using a carbonate or $CO_2$.

When performing a first, optional, solid-liquid separation between the leaching steps, it is possible to recover the solution used in the first leaching step, containing any excess of the leaching chemical, i.e. the alkali metal carbonate, and recycle it. This recycling, in turn, reduces the need for a separate pH adjustment in the later stages of the process, and likewise reduces the chemical consumption in the process.

According to a preferred embodiment of the present invention, when a first solid-liquid separation is carried out between the two leaching steps, the obtained solids are partly recovered and carried to a separate process for recovering pure lithium carbonate.

When applying this preferred embodiment, the method can also include the steps of recycling the crystallized lithium carbonate to the second hydroxide leaching step.

The present invention relates also to an arrangement for recovering lithium hydroxide from a raw material containing lithium according to the above method, which arrangement comprises
- a pulping unit 1 for pulping the raw material containing lithium in the presence of water and an alkali metal carbonate,
- a first leaching unit 2 for leaching a first slurry containing lithium at an elevated temperature,
- a second leaching unit 3 for leaching a second slurry containing lithium carbonate, or a fraction thereof, in the presence of water and an alkali earth metal hydroxide,
- a solid-liquid-separation unit 31 for separating a third slurry containing lithium hydroxide into solids and a solution containing lithium, and
- a crystallising unit 4 for recovering lithium hydroxide monohydrate from a solution containing lithium.

Preferably, the arrangement further comprises:
- a purification unit 32 connected to the solid-liquid-separation unit 31, for purifying the solution obtained from said separation unit 31, and a line 403,414 for carrying a solution from the crystallizing unit 4 to a point further upstream of the crystallizing unit (4), or back to the crystallization unit 4.

According to an embodiment of the invention the arrangement comprises also the necessary lines for carrying the solutions to be recycled to their intended units.

BRIEF DESCRIPTION OF THE DRAWINGS

In the following the invention will be described in greater detail by means of preferred embodiments with reference to FIGS. 1, 2, 3, 4 and 5, which all show general flow diagrams and arrangements of units of certain embodiments of the invention.

DETAILED DESCRIPTION OF THE INVENTION

Figure 1:
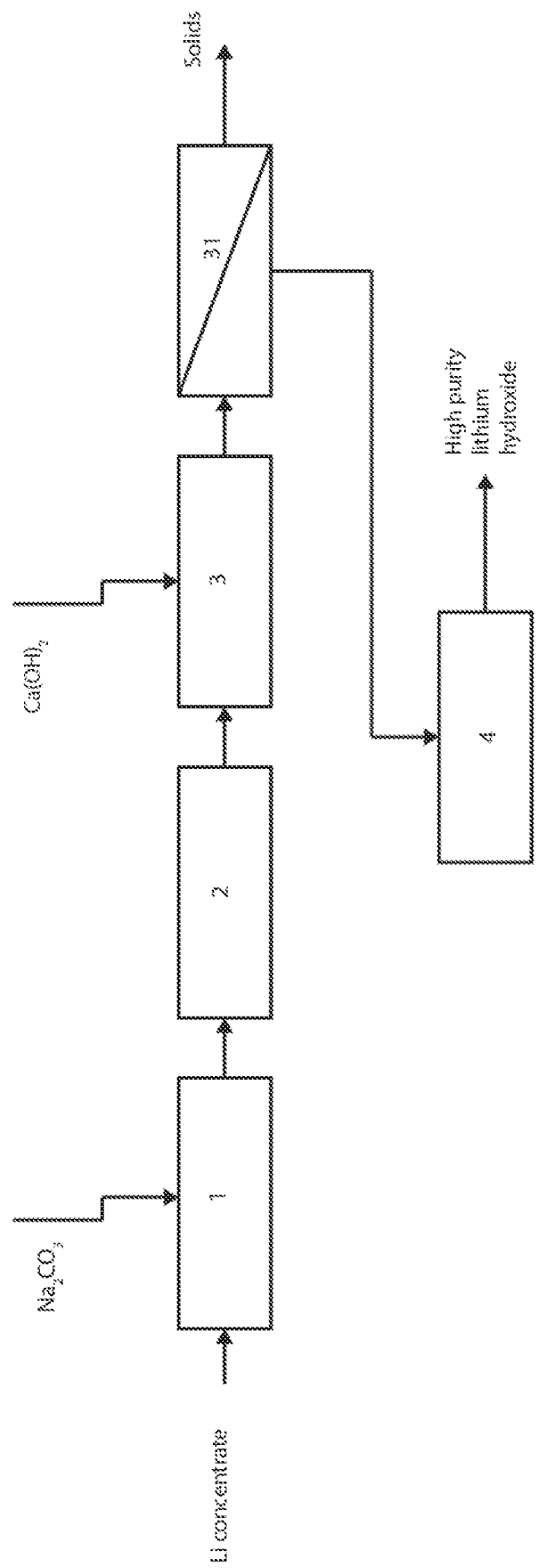

An embodiment of the method of the invention, as presented schematically in FIG. 1, is a method for recovering lithium hydroxide from a raw material containing lithium, the method of this particular embodiment including pulping 1 the raw material in the presence of sodium carbonate, leaching the obtained slurry in a first leaching step 2, followed by leaching in a second leaching step 3, in the presence of calcium hydroxide, whereafter the obtained slurry is separated 31 into solids and a liquid, whereby the liquid can be carried to a crystallization step 4, for producing high purity lithium hydroxide.

Figure 2:
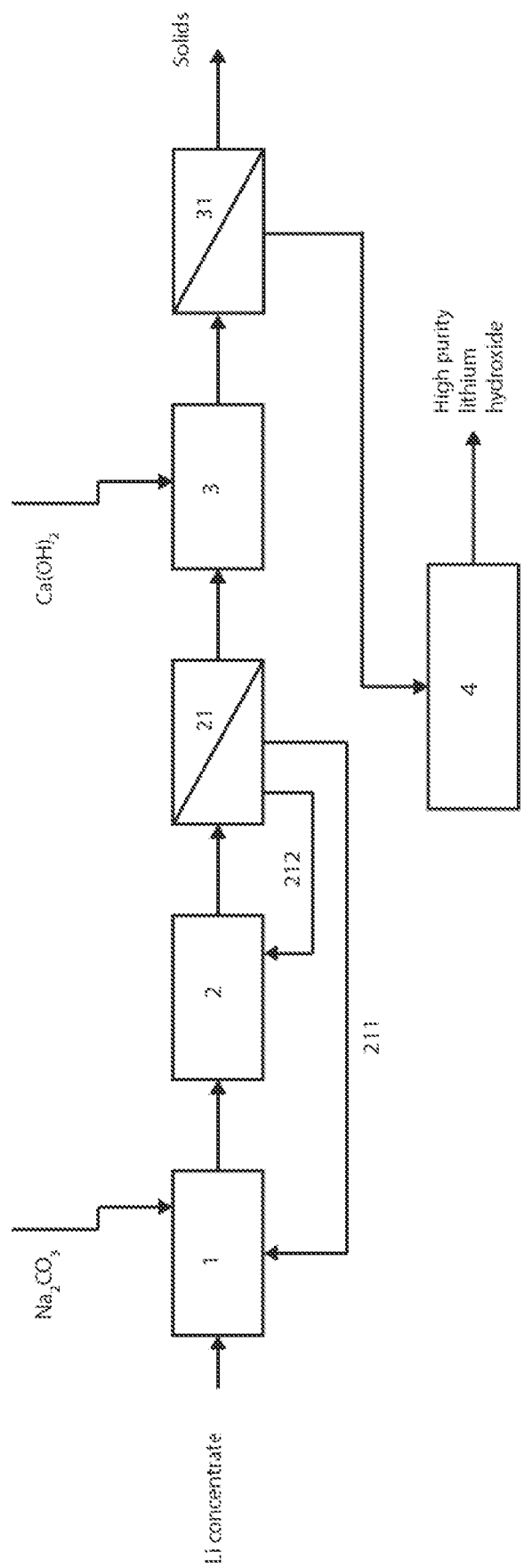

Another embodiment of the invention, as presented schematically in FIG. 2, is a method for recovering lithium hydroxide from a raw material containing lithium, this embodiment further specifying that a first solid-liquid separation 21 can be carried out already after the first leaching step 2, whereby at least a fraction of the liquid fraction can be recycled to either the pulping step 1, via line 211, or to the first leaching step 2, via line 212.

Figure 3:
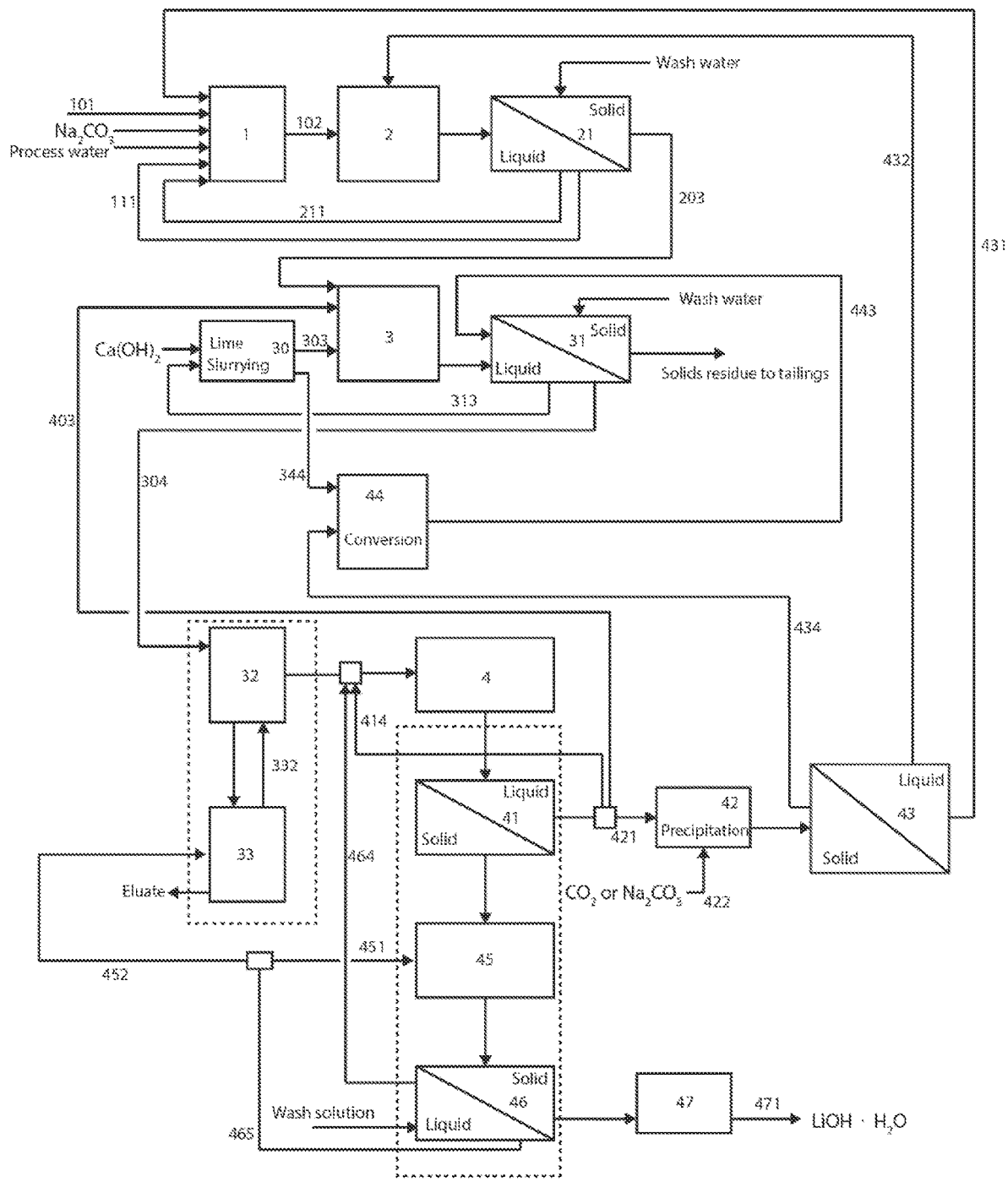
Figure 4:
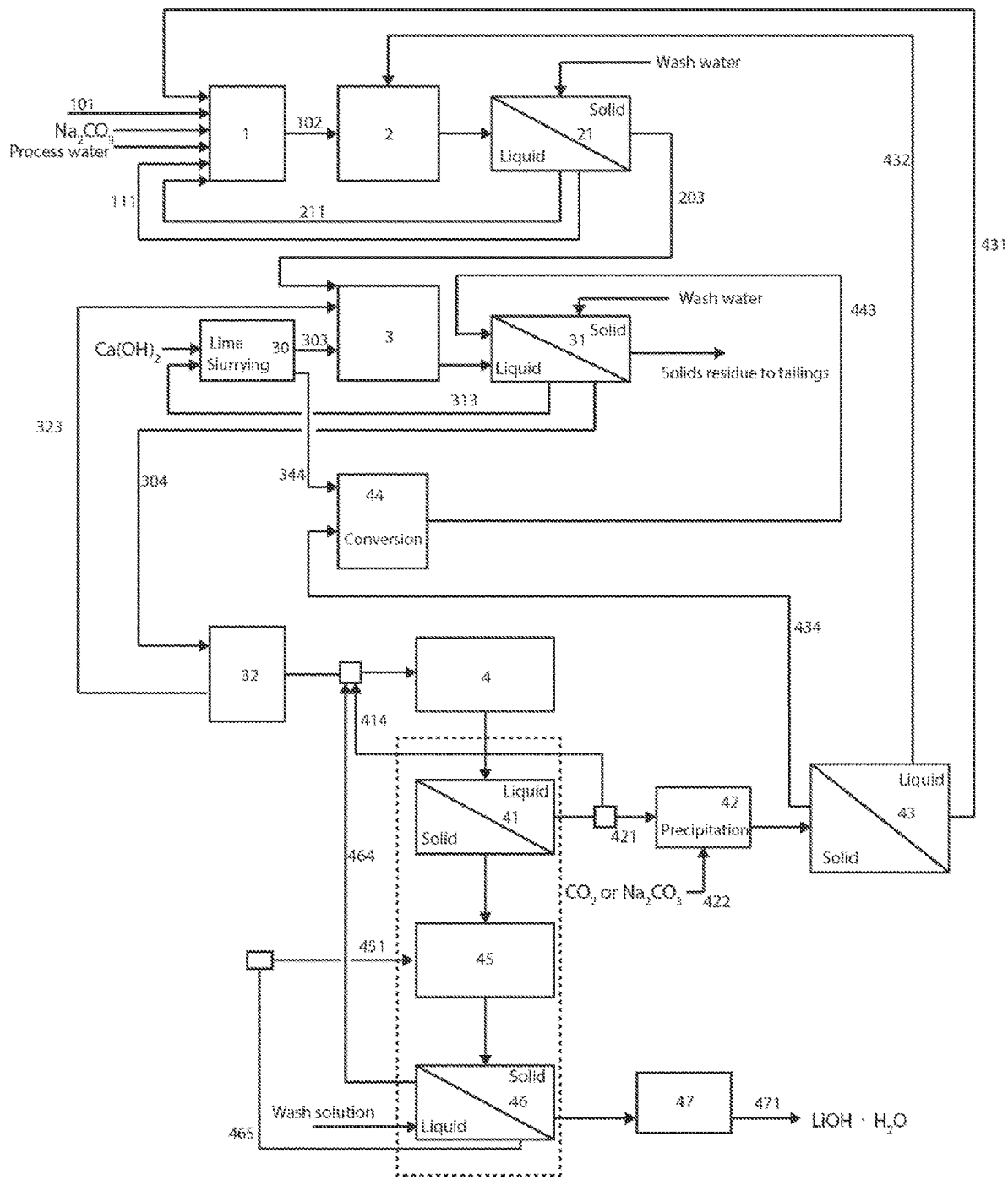
Figure 5:
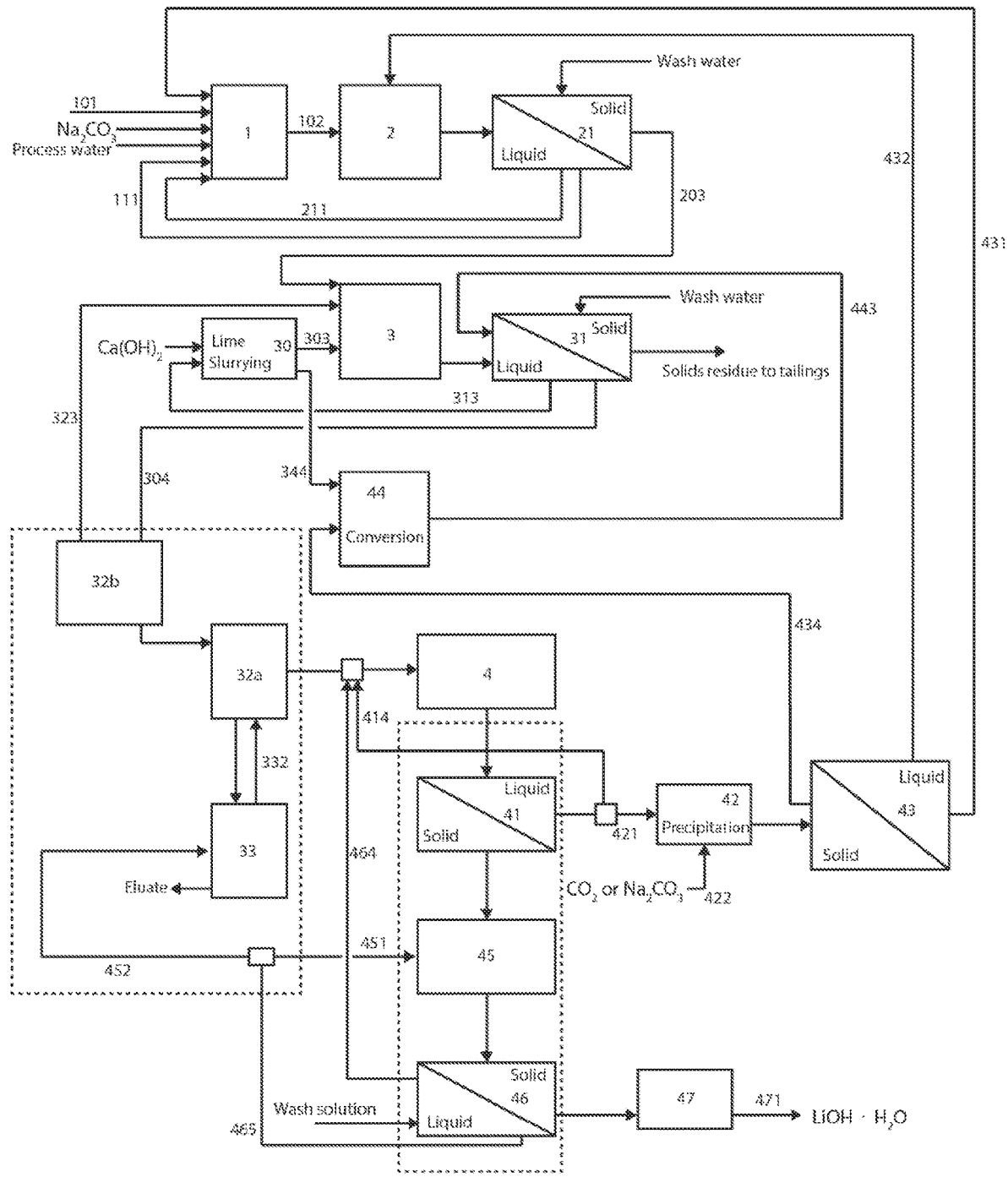

Further embodiments of the invention are illustrated in FIGS. 3 to 5, whereby FIG. 3 shows a number of optional details of the method and arrangement of the invention, based on a specific embodiment, and FIGS. 4 and 5 show a couple of specific options relating to the purification step 32. All these options are described in more detail below.

The dotted lines in the drawings indicate that the units within these dotted lines can be combined in certain embodiments of the invention.

In the present invention, the raw material containing lithium is typically selected from spodumene, petalite, lepidolite or mixtures thereof. The raw material is a preferably a lithium-containing mineral in calcined form, more preferably obtained by heat treating the raw material, most suitably by using a temperature of approximately 1050° C.

A particularly preferred mineral is spodumene, providing beta-spodumene in a calcination step.

The method of the invention comprises pulping 1 the raw material containing lithium in the presence of water and an alkali metal carbonate for extracting the lithium from the raw material and producing a first slurry containing lithium. The pulping 1 can be performed in any suitable vessel or reactor by contacting a feed containing lithium mineral with an alkali metal carbonate and water for producing a first slurry containing lithium.

The alkali metal carbonate is preferably selected from sodium and potassium carbonate, most suitably being at least partly composed of sodium carbonate. Typically, the alkali metal carbonate is present in excess. After pulping, the first lithium-containing slurry is leached 2 for a first time for producing a second slurry containing lithium carbonate.

The presence of alkali metal carbonate and process conditions result in the formation of lithium carbonate and analcime solids, which can be presented in the case of spodumene and sodium carbonate with the following formula (1).

$$2LiAl(SiO_3)_2 + Na_2CO_3 = 2NaAl(SiO_3)_2 + Li_2CO_3 \qquad (1)$$

The first leaching 2 of the first slurry containing lithium is typically performed in a suitable autoclave or series of autoclaves at an elevated temperature.

In an embodiment of the invention, the first leaching step is carried out at a temperature of 160 to 250° C., preferably at a temperature of 200 to 220° C. Likewise, the first leaching step is preferably carried out at a pressure of 10 to 30 bar, preferably 15 to 25 bar. Suitable conditions for the first leaching step are typically achieved using high-pressure steam.

In another embodiment, at least a fraction of the water and alkali metal carbonate carried to the pulping step is a recycled aqueous solution containing said alkali metal carbonate.

An optional solid-liquid separation step 21 can be carried out, wherein the solution can be separated from the solids after the first leaching step 2, and the solids carried to the second leaching step 3.

In an embodiment, the solution separated from the solids in the optional separation step 21 is recycled to one or more of the preceding steps.

Preferably, the solution is recycled either to the pulping step or to the first leaching step, or a fraction to each. More preferably, the solution is recycled to the pulping step.

In the second leaching step 3, the lithium-containing phase (here typically the solids, or the entire second slurry) is leached 3 for a second time using a hydroxide reagent, i.e. an alkaline earth metal hydroxide, followed by a separation of solids from the solution by solid-liquid separation 31 and by the preparation of lithium hydroxide-containing solution of relatively high purity.

The alkali earth metal hydroxide used in the second leaching step 3 is preferably selected from calcium and barium hydroxide, more preferably being calcium hydroxide, optionally prepared by reaction of calcium oxide (CaO) in the aqueous solution.

In an embodiment of the invention, the alkali earth metal hydroxide used in the second leaching step 3 is mixed with water or an aqueous solution prior to addition to the second leaching step 3.

Preferably, at least a fraction of the solution separated from the solids in separation step 31, containing among others lithium and sodium, is added to said second leaching step in the form of a recycled solution, preferably mixed with fresh alkali earth metal hydroxide prior to addition to the second leaching step, more preferably mixed with fresh alkali earth metal hydroxide in a separate slurrying step 30.

The second leaching step 3 is typically carried out at a temperature of 10-100° C., preferably 20-60° C., and most suitably 20-40° C. Typically, the second leaching step 3 is carried out at atmospheric pressure.

The presence of alkaline earth metal hydroxide and process conditions result in the formation of lithium hydroxide, which can be presented in the case of analcime, lithium carbonate and calcium hydroxide with the following formula (2).

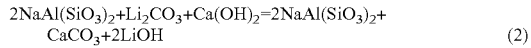

$$2NaAl(SiO_3)_2 + Li_2CO_3 + Ca(OH)_2 = 2NaAl(SiO_3)_2 + CaCO_3 + 2LiOH \quad (2)$$

After the two leaching steps 2,3 have been performed, the obtained third lithium hydroxide-containing slurry is separated 31 into a solid phase and a solution. The separation 31 can be done with any suitable solid-liquid separation method. For example, the third slurry can be routed to a thickener, from where the overflow can be routed directly to purification and the underflow can be filtered further in order to recover all lithium hydroxide present in the solution and separate it from solid impurities, or a simple filtering technique can be used. Typically, all solid-liquid separations described herein require a supply of washing water for washing of the solids, although no such supply is separately mentioned. The obtained solids from this separation of the third slurry into solids and a solution are typically composed of unwanted residues, which can be discarded, e.g. as tailings.

As stated above, the third slurry separated from the second leaching step 3 is purified 32 before carrying it to the crystallization step. This purification step is preferably based on purification of dissolved ions and components, and more preferably includes an ion exchange or a membrane separation, or both, most suitably by using a cation exchange resin, particularly a selective cation exchange resin.

The ion exchange can be performed for example by using a method disclosed in Finnish patent 121 785.

Typically the purifying by ion exchange is performed by using cation exchange resin, wherein the cation exchange group is for example iminodiacetic acid (IDA) or aminophosphonic acid (APA).

Selective cation exchange resins typically have a chelating functional group attached to the resin matrix. These chelating functional groups usually have a much higher selectivity towards multi-valent metal cations, such as heavy and alkaline earth metal cations, compared to the monovalent alkali metal cations (Li, Na, K). Suitable resin functionalities are, for example the above mentioned iminodiacetate and the aminophosphonate. These chelating resins can be used to purify the typical cationic impurities, such as calcium ions ($Ca^{2+}$) from lithium hydroxide solutions.

In an embodiment, the step of purifying the solution obtained from the third slurry is carried out at least partly using a resin that has been regenerated in a separate regeneration step.

Preferably, the regeneration step is carried out using a recycled solution from a subsequent process step, more preferably being the separated solution obtained during the crystallization, optionally in purified form.

In a preferred embodiment, this regeneration is carried out using at least acidic solution for metal elution, preferably being hydrochloric acid (HCl), and an alkaline solution for neutralization, preferably being sodium hydroxide (NaOH) or an alkaline lithium hydroxide solution, more preferably a recycled solution containing lithium hydroxide. Further, water can be fed to the regeneration step. The regenerated resin can be fed back to the ion exchange.

These purification and regeneration steps can, however, also be combined, and carried out in the same purification unit.

The membrane separation can be carried out using a semi-permeable membrane, which separates ionic or other dissolved compounds from aqueous solutions. More precisely, the membrane separation can be used to fractionate the dissolved ions and compounds by their size (depending on the pore size of the membrane material), and/or their charge (depending on the surface charge of the membrane material). A positive surface charge repels cations (with a stronger repelling action for multi-valent cations) and attracts anions, and vice versa. These phenomena will enable the purification of, for example, multi-valent metal cations, complexed species (such as aluminium hydroxide complexes), polymeric species (such as dissolved silica) and larger anions (e.g. sulfate and carbonate ions) from lithium hydroxide solutions. With the membrane separation, no regeneration is required.

Since lithium hydroxide is a strong alkali having a high concentration of hydroxide ions, metals that are strongly complexed by hydroxide ions (such as aluminium ions, $Al^{3+}$) cannot be purified by the above mentioned selective cation exchange resins. Therefore, these ions are purified using the herein described recirculations.

The selective cation exchange is preferably used in the polishing removal of multivalent metal cations that form sparingly soluble hydroxide compounds (typically calcium hydroxide). These metals (or metal cations) should be removed, or at least their concentrations should be reduced to very low levels in the solution to be carried to the crystallization, in order to prevent them from contaminating the crystallized lithium hydroxide monohydrate product. The removal of these metals is not as efficient with membranes, and is thus preferably done by ion exchange, particularly with a selective cation exchange resin.

In case a membrane separation is carried out, either alone or combined with an ion exchange, a recycle stream is provided from the membrane separation, which is suitable for carrying to the second leaching step 3.

In membrane separation, the retained ions and compounds will end up in a concentrated fraction, typically called the "retentate", which can be recycled to the second leaching step as described above. The other obtained fraction is the permeated liquid fraction, i.e. the "permeate", which is fed to the crystallization, optionally via the ion exchange purification, if these purifications are combined.

The fraction to which each ion and compound ends up in the membrane separation depends on their characteristics: for example their charge and size. This targeting of the retention can be done based on selection of the desired membrane type, based on surface charge and/or pore size.

For the charge, the targeted retained species would typically be multivalent metal cations, for example: calcium ions ($Ca^{2+}$), magnesium ions ($Mg^{2+}$) vs. permeated (or zero to negatively retained) monovalent alkali metal cations, such as lithium ions ($Li^+$) or sodium ions ($Na^+$).

For the size, the retained species would typically be larger compounds, for example: polymeric species (such as dissolved silica), complexed ions (such as aluminium hydroxide complexes), and the largest types of anions (such as carbonate, $CO_3^{2-}$, and sulfate, $SO_4^{2-}$), whereas the smallest types of anions (such as hydroxide, $OH^-$), are permeated (or: has zero or negative retention).

Based on the above, it is particularly preferred to combine a membrane separation with an ion exchange, most suitably by first carrying out a membrane separation, and then an ion exchange for polishing removal of multivalent metal cations.

Finally, crystals of lithium hydroxide monohydrate are recovered by crystallising 4 from the purified lithium-containing solution. The crystallizing is typically performed by heating the purified solution containing lithium to a temperature of approximately the boiling point of the solution, to evaporate the liquid, or by recrystallizing the monohydrate from a suitable solvent.

In an embodiment of the invention, two or more crystallization units are used, preferably being sequentially arranged.

The method of the invention enables production of pure lithium hydroxide monohydrate with excellent yield and purity in a continuous and simple process, typically providing battery grade lithium hydroxide monohydrate crystals, having a purity of 56.5% or higher of lithium hydroxide.

In another embodiment, the purified solution containing lithium hydroxide is mixed with one or more solutions recycled from subsequent steps of the method before being carried to the crystallization step 4, or these solutions can be fed separately to the crystallization 4.

Preferably, the crystallization step 4 is followed by a solid-liquid separation step 41.

The bleed solution obtained while crystallizing 4 the lithium hydroxide monohydrate can be recovered and recycled to one or more of the previous process steps, for example the pulping step 1, second leaching step 3, a separation step 31, and/or back to the crystallization step 4.

Thus, it is preferred to recycle at least a fraction of the solution separated from the crystallization step to a preceding step with lower alkalinity, or back to the crystallization step 4.

The advantage achieved by recycling said fraction to a preceding step with lower alkalinity is that some impurities in the crystallization liquids (e.g. aluminium and silicon) have a solubility that increases with increasing alkalinity (e.g. caused by increasing lithium hydroxide concentration), whereby these alkali-soluble impurities can be removed by recycling them in solution to a step of lower alkalinity. One preferred alternative is to recycle at least a fraction of said crystallization liquid, or bleed solution, to the second leaching step 3, or to a preceding step (typically the pulping or first leaching), from which they can be carried to the second leaching step 3. In said lower alkalinity environment, these impurities form sparingly soluble compounds (e.g. aluminium hydroxide), and can be discarded with the solids in separation step 31. Also soluble carbonate ions are carried to the second leaching step 3, or to a preceding step (typically the pulping 1 or first leaching 2, from which they can be carried to the second leaching step) using this recycle option. Carbonate ions form sparingly soluble compounds in the second leaching step 3 and can be discarded with the solids in the separation step 31.

In an embodiment of the invention, at least a fraction of the solution separated from the crystallization step is recycled to the second leaching step, and optionally a further fraction to the pulping step. The advantage of these recycling options is that the soluble impurities remaining in the liquids after crystallization (main impurities being sodium, potassium, aluminium and carbonate ions, as well as soluble silicon and silicates) can be circulated upstream, where they can be removed. Particularly in the leaching steps, these impurities form sparingly soluble compounds, which can be discarded as solids after the second leaching step. Without this recycling option, these impurities are typically concentrated in the crystallization step, and contaminated in the product.

In another embodiment, at least a fraction of the solution separated from the crystallization step is recycled back to the crystallization step. In a typical crystallization process, the crystallization slurry is maintained in a continuous circulation, from which product crystals are continuously separated, and the advantage of recycling at least a fraction of the remaining mother liquid is that it increases the yield of the process.

As mentioned above, it is preferred to recycle at least a fraction of the solution separated from the crystallization step to the second leaching step or back to the crystallization. It is, however, particularly preferred to recycle the solution at least to the second leaching, or advantageously to both the second leaching and the crystallization.

In a further embodiment, at least a fraction of the solution separated from the crystallization step is carried to a lithium precipitation step, which preferably is carried out as a carbonation, wherein the solution is reacted with either carbon dioxide or an alkali metal carbonate in order to form a lithium carbonate slurry.

This optional lithium precipitation step has the advantage of reacting lithium hydroxide contained in the crystallization bleed solution into the corresponding carbonate. This lithium hydroxide should preferably not be returned to the pulping or first leaching steps of the process.

After the optional lithium precipitation step, the lithium carbonate slurry is preferably subjected to a solid-liquid separation step, from which at least a fraction of the solids is carried to a conversion step. In this preferred conversion step, the solids are mixed with an alkali earth metal slurry, the conversion step preferably performed at a temperature close to the boiling point of water, more preferably at a temperature of 90 to 100° C., whereby the lithium carbonate of the solids is solubilized as lithium hydroxide, also forming calcium carbonate.

After the optional lithium precipitation step, the lithium carbonate slurry is preferably subjected to a solid-liquid separation step, from which at least a fraction of the solids is carried to a conversion step, and then recycled to the solid-liquid separation step following the second leaching step.

Preferably, at least a fraction of the solution separated from the solids after the optional lithium precipitation step is recycled to the pulping step, or to the first leaching step, or a fraction to each, more preferably at least a fraction to the pulping step.

The advantage achieved by recycling said fraction to pulping or first leaching is that some impurities (e.g. sodium and potassium) have a high solubility in the crystallization liquids, but these impurities form sparingly soluble compounds (e.g. analcime) in the pulping and/or first leaching step and they can be discarded in the separation step 31.

In an embodiment of the invention, the solids obtained in the crystallization step, containing crystals of lithium hydroxide monohydrate, are purified using a washing solution before recovery as the product.

The purified crystals of lithium hydroxide monohydrate are preferably separated from the washing solution, are dried, and thereafter recovered.

The spent washing solution is, in turn, preferably separated from the purified crystals of lithium hydroxide monohydrate, and is recycled to the crystal washing step or to a step of regenerating a resin intended for being carried to the purification step, or to the crystallization step, or a fraction of the spent washing solution is recycled to two or all three of these steps.

It is particularly preferred to recycle at least a fraction of this spent washing solution (or crystallization mother liquid) to the regeneration step, since the solution is relatively pure and contains uncrystallized lithium hydroxide, which should be reused, particularly in a step upstream from the crystallization, or in the crystallization. Thus, the regeneration 33 is an option for the recycling.

The present invention relates also to an arrangement for recovering lithium hydroxide from a raw material containing lithium according to the method of the present invention. The referral numbers referring to FIG. 1 in connection with the description of the method correspond to the referral numbers used in connection with the description of the arrangement, thus the method steps of the method correspond to the units of the arrangement. The arrangement comprises
- a pulping unit 1 for pulping the raw material containing lithium in the presence of water and an alkali metal carbonate,
- a first leaching unit 2 for leaching a first slurry containing lithium at an elevated temperature,
- a second leaching unit 3 for leaching a second slurry containing lithium carbonate, or a fraction thereof, in the presence of water and an alkali earth metal hydroxide,
- a solid-liquid-separation unit 31 for separating a third slurry containing lithium hydroxide into solids and a solution containing lithium hydroxide,
- a purification unit 32 connected to the solid-liquid-separation unit 31, for purifying the solution obtained from said separation unit 31, and
- a crystallising unit 4 for recovering lithium hydroxide monohydrate from a solution containing lithium,
  which further comprises a line 403,414 for carrying a solution from the crystallizing unit 4 to a point further upstream of the crystallizing unit 4, or back to the crystallization unit 4.

In an embodiment of the invention, the arrangement further comprises a calcination unit 10 for heat treating the raw material intended to be carried to the pulping unit 1.

The pulping unit 1 preferably contains also a feed inlet 101 for supplying the raw material containing lithium to the unit 1.

Further, an inlet 111 can be added, in connection with the pulping unit 1, for carrying a recycled aqueous solution containing alkali metal carbonate to the pulping unit 1.

The first leaching unit 2 is preferably an autoclave.

In an embodiment, the first leaching unit 2 is connected to the pulping unit 1 via a slurry line 102.

In an embodiment, a solid-liquid separation unit 21 is arranged between the first leaching unit 2 and the second leaching unit 3.

Preferably, a recycle line 211,212 leads from the first leaching unit 2, or from the liquid section of a solid-liquid separation unit 21 connected to said first leaching unit 2, to a unit upstream from said first leaching unit 2.

More preferably, a recycle line 211,212 leads from the first leaching unit 2, or from the liquid section of a solid-liquid separation unit 21 placed in connection with said first leaching unit 2, either as line 211 to the pulping unit 1 or as line 212 to the first leaching unit 2, or a separate line 211 and 212 to each.

Even more preferably, a recycle line 211 leading from the first leaching unit 2, or from the liquid section of a solid-liquid separation unit 21 connected to said first leaching unit 2, to the pulping unit 1.

In an embodiment of the invention, the second leaching unit 3 is a tank reactor, preferably a stirred tank reactor.

Preferably, the second leaching unit 3 includes an inlet 303 for alkali earth metal hydroxide or an aqueous slurry thereof.

In another embodiment, the second leaching unit 3 is connected to a slurrying unit 30 for mixing an alkali earth metal hydroxide into an aqueous slurry.

In a further embodiment, the second leaching unit 3 is connected to the first leaching unit 2, or to a downstream solid-liquid separation unit 21, via a slurry line 203.

The purification unit 32 used in the purification of the solution separated from the third slurry preferably includes a membrane separation unit or an ion exchange unit, or both, preferably an ion exchange unit, and more preferably a cation exchange unit, particularly being a selective cation exchange unit.

In a preferred embodiment (see FIG. 3), where the purification unit 32 is an ion exchange unit, it is connected to a regeneration unit 33 for regenerating a purification resin. This regenerated resin can then be fed via a recycle line 332 back to the ion exchange unit 32. However, these purification and regeneration steps can also be carried out in a single unit 32 (see dotted line around units 32 and 33 of FIG. 3).

No such regeneration is required when the purification unit 32 is a membrane separation unit (see FIG. 4). However, in the case a membrane separation unit is used, the unit provides two streams, one being a purified solution, which can be carried directly to the crystallization unit 4, while the other is a recycle stream, which is suitable for carrying to the second leaching unit 3, for example via a recycle line 323.

In a further embodiment of the invention (see FIG. 5), the arrangement of the invention can include both an ion exchange unit 32a and a membrane separation unit 32b, and thus also a regeneration unit 33. Due to the presence of the membrane separation unit 32b, a recycle stream can be provided, carrying a recycle stream via line 323 to the second leaching unit 3.

In said embodiment it is particularly preferred to position the ion exchange unit 32a downstream from the membrane separation unit 32b.

In an embodiment of the invention, the arrangement includes two or more crystallization units 4, preferably being sequentially arranged.

Preferably, the crystallization unit 4, or a downstream purification unit 32, or an optional regeneration unit 33, is connected to the second leaching unit 3, or the downstream solid-liquid separation unit 31 via liquid line 304.

In an embodiment, the arrangement comprises a solid-liquid separation unit 41 connected to the crystallization unit 4 for separating the crystals obtained in the crystallization unit 4 from the spent solution.

Preferably, a recycle line 403,414 is arranged between the crystallizing unit 4, and/or the liquid section of the solid-liquid separation unit 41 connected to the crystallization unit 4, and an upstream unit.

More preferably, a recycle line 403 is arranged between the crystallizing unit 4, and/or the liquid section of the solid-liquid separation unit 41 connected to the crystallization unit 4, and the second leaching unit 3, and optionally a further line arranged between the crystallization unit 4, and/or the liquid section of the solid-liquid separation unit 41 connected to the crystallization unit 4, and the pulping unit 1.

In an embodiment of the invention, the arrangement comprises a lithium precipitation unit 42 connected to the crystallization unit 4 or the solid-liquid separation unit 41 through a line 421.

Preferably, the lithium precipitation unit 42 includes a feed inlet 422 for feeding carbon dioxide or an alkali metal carbonate to the unit 42.

More preferably, the arrangement includes a solid-liquid separation unit 43 connected to and downstream from the lithium precipitation unit 42.

Even more preferably, the lithium precipitation unit 42, and/or a solids section of a solid-liquid separation unit 43 connected to said lithium precipitation unit 42, is connected via a recycle line 434 to a conversion unit 44.

In an embodiment of the invention, the conversion unit 44 contains an inlet 344 for alkali earth metal hydroxide or an aqueous slurry thereof.

Preferably, the conversion unit 44 is connected to a slurrying unit 30 for mixing an alkali earth metal hydroxide into an aqueous slurry, and from which slurry can be fed to the conversion unit 44.

More preferably, the conversion unit 44 is connected via line 443 to the second leaching unit 3, and/or to the solid-liquid separation unit 31 connected to the second leaching unit 3.

In an embodiment, the liquid section of a solid-liquid separation unit 41,43, preferably a unit 43 following the optional precipitation unit 42, is connected via line 431 to the pulping unit 1, whereby at least a fraction of the solution obtained in the separation unit 41,43 can be recycled to said pulping unit 1.

Alternatively, the liquid section of said solid-liquid separation unit 41,43, preferably a unit 43 following the optional precipitation unit 42, is connected via a further recycle line 432 to the first leaching unit 2, whereby at least a fraction of the solution obtained in the separation unit 41,43 can be recycled to said first leaching unit 2.

The solids obtained in separation unit 41,43, preferably a unit 43 following the optional precipitation unit 42, can optionally be recycled to a conversion unit 44 for solubilization, particularly via a recycle line 434.

In an embodiment, the liquid section of the solid-liquid separation unit 41 is connected to the crystallization unit 4 via recycle line 414, for recycling the spent solution separated from the crystallization step back to the crystallization unit 4.

In another embodiment of the invention, the arrangement includes a purification unit 45 connected to the crystallization unit 4, and/or to a solid-liquid separation unit 41 connected to the crystallization unit 4, wherein the solids obtained in the crystallization step can be purified.

Preferably, the purification unit 45 includes a feed inlet 451 for feeding a washing solution into the purification unit 45.

In an embodiment, the arrangement includes a solid-liquid separation unit 46 connected to and downstream from the purification unit 45, for separating the purified crystals of lithium hydroxide monohydrate from the spent washing solution.

Preferably, the purification unit 45, or a solid-liquid separation unit 46, connected to and downstream from the purification unit 45 is connected via a recycle line 452 to the upstream purification unit 32, or to an optional regeneration unit 33.

More preferably, a solid-liquid separation unit 46 connected to and downstream from the purification unit 45 is connected via a recycle line 464 to the crystallization unit 4.

Even more preferably, a solid-liquid separation unit 46 connected to and downstream from the purification unit 45 is connected via a recycle line 465 to the purification unit 45.

In another option, the arrangement of the invention comprises a combined purification unit 41,45,46 for purifying the crystals obtained in the crystallization unit 4 from the spent solution, and separating the purified crystals from the spent washing solution.

In this alternative option, the recycle line 414 connects the combined unit 41,45,46 to the crystallization unit. Likewise, the feed inlet 451 is connected to the combined purification unit 41,45,46. Further, the recycle line 452 connects the combined purification unit 41,45,46 is connected to the upstream purification unit 32, or to a separate regeneration unit 33, and the recycle 464 line connects the combined purification unit 41,45,46 to the crystallization unit (4). Finally, the recycle line 465 connects a solids section of the combined purification unit 41,45,46 to the liquid section of the same combined unit 41,45,46.

In an embodiment of the invention, the arrangement includes a drying unit 47, connected to the crystallization unit 4, or connected to a solids section of a solid-liquid separation unit 41,46 downstream from the crystallization unit 4, wherein the obtained crystals of lithium hydroxide monohydrate can be dried.

Preferably, the drying unit 47 includes a product outlet 471 through which the final, battery grade, product can be recovered.

REFERENCE NUMBERS

The reference numbers according to an embodiment of the present invention, as used in FIGS. 1 to 5, are shown below (some of these units and lines being optional):

- 10 calcination unit
- 1 pulping unit
- 101 feed inlet for supplying raw material to the pulping unit 1
- 102 slurry line for carrying a first slurry from the pulping unit 1 to the first leaching unit 2

111 feed inlet for supplying recycled solution to the pulping unit 1
2 first leaching unit
203 slurry line for carrying a second slurry from the first leaching unit 2 to the second leaching unit 3
21 solid-liquid separation unit
211 recycle line from separation unit 21 to pulping unit 1
212 recycle line from separation unit 21 to first leaching unit 2
3 second leaching unit
30 slurrying unit for mixing an alkali earth metal hydroxide into an aqueous slurry
303 inlet for supplying alkali earth metal hydroxide or an aqueous solution thereof to the second leaching unit 3
304 liquid line for carrying a third slurry from the second leaching unit 3, or from the separation unit 31, to the purification unit 32 or to the optional regeneration unit 33
31 solid-liquid separation unit
313 recycle line for carrying a solution obtained from the separation unit 31 to the second leaching unit 3, or to the optional slurrying unit 30
32 purification unit downstream from the S/L separation unit 31, and upstream from the crystallization unit 4
323 recycle line for carrying a recycle stream from the purification unit 32 to the second leaching unit 3
33 regeneration unit
332 recycle line for carrying a regenerated stream from the regeneration unit 33 to the purification unit 32
4 crystallizing unit
401 recycle line from crystallizing unit 4 to pulping unit 1 (not shown in the drawings)
403 recycle line from crystallizing unit 4, or the separation unit 41, to the second leaching unit 3
41 solid-liquid separation unit
414 recycle line from a downstream point of the crystallization unit 4, or from the separation unit 41, back to the crystallizing unit 4
42 lithium precipitation unit
421 slurry line for carrying a reacted slurry from the crystallization unit 4, or the separation unit 41, to the lithium precipitation unit 42
422 feed inlet for supplying carbon dioxide or an alkali metal carbonate to the precipitation unit 42
43 solid-liquid separation unit
431 recycle line for carrying a solution from the precipitation unit 42, or the separation unit 43, to the pulping unit 1
432 recycle line for carrying a solution from the precipitation unit 42, or the separation unit 43, to the first leaching unit 2
434 recycle line for carrying a solid fraction from the lithium precipitation unit 42, or the separation unit 43, to the conversion unit 44
44 conversion unit
344 inlet for supplying the conversion unit with alkali earth metal hydroxide or an aqueous slurry thereof
443 recycle line for carrying slurry from the conversion unit
44 to the second leaching unit 3 or the separation unit 31
45 purification or washing unit
451 feed inlet for supplying washing solution to the purification or washing unit 45
452 recycle line for carrying spent washing solution to the upstream purification unit 32, or to an optional regeneration unit 33
46 solid-liquid separation unit
464 recycle line for carrying spent solution from purification unit 45 or the separation unit 46 to the crystallization unit 4
465 recycle line for carrying spent solution from purification unit 45 or the separation unit 46 to the purification or washing unit 45
47 drying unit
471 product outlet for crystallized and optionally purified and dried lithium hydroxide monohydrate 30

It will be obvious to a person skilled in the art that, as the technology advances, the inventive concept can be implemented in various ways. The invention and its embodiments are not limited to the examples described above but may vary within the scope of the claims.

EXAMPLES

Example 1

The soda leaching was carried out on a slurry containing lithium, and obtained by pulping a beta-spodumene mineral sample. The leaching was performed in an autoclave with the presence of high-pressure steam and at a temperature of 220° C. with a retention time of 1.5 h, with an initial solids content of 29.5 wt-%, a sodium to lithium excess in the feed of 10%, giving a pH of about 11.5.

The solids were separated from the obtained leached solution through filtration, and the obtained solid fraction was carried to a second leaching vessel, where leaching tests were carried out as shown in the following Table 1:

TABLE 1

| Test | Time h | Temperature °C. | pH | Li mg/L | Na mg/L | Al mg/L | Ca mg/L | Mn mg/L | Mg mg/L | P mg/L | K mg/L | Fe mg/L | Si mg/L | B mg/L | Be mg/L | S mg/L | Ti mg/L | Bi mg/L |
|---|---|---|---|---|---|---|---|---|---|---|---|---|---|---|---|---|---|---|
| CL1 | 1 | 38 | 10.9 | 6610 | 630 | 51 | 11 | <1 | <1 | <50 | 30 | <2 | 161 | <2 | <1 | <20 | <1 | <5 |
| CL1 | 2 | 35 | 10.9 | 6820 | 687 | 77 | 11 | <1 | <1 | <50 | 31 | <2 | 169 | <2 | <1 | <20 | <1 | <5 |
| CL2 | 1 | 22 | 11.4 | 6840 | 528 | <5 | 34 | <1 | <1 | <50 | 22 | <2 | 16 | <2 | <1 | <20 | <1 | <5 |
| CL2 | 2 | 22 | 11.4 | 6870 | 528 | 8 | 25 | <1 | <1 | <50 | 23 | <2 | 26 | <2 | <1 | <20 | <1 | <5 |

These tests showed that the used ~10% $Ca(OH)_2$ excess to lithium content was sufficient to provide the desired end-result, i.e. a lithium hydroxide solution with a low content of impurities. Also the temperature of 20-40° C. was sufficient.

The lower temperature of 22° C. produced a more pure solution in general, particularly in relation to the content of aluminium and silicon. Further, the aluminium and the silicon are efficiently reduced with the help of the recycling steps of the present invention.

The calcium concentration in the solution was higher at this lower temperature compared to the concentration achieved at the higher temperatures.

Example 2

The LiOH production process was carried out as a bench scale pilot according to the flow sheet shown in FIG. 3 (without the recycling line 432). The purification step 32 was performed with selective cation exchange. The raw material was a calcined beta-spodumene concentrate, with 6.5% $Li_2O$ concentration. In the second leaching step 3, the solid residue obtained after S/L separation 31 contained mainly analcime and calcium carbonate, and had an average Li concentration of 0.2%, which corresponded to a Li extraction of 91%. High purity $LiOH \cdot H_2O$ crystals were produced with a single crystallization stage. With the flow sheet shown in FIG. 3 (without the recycling line 432), the average impurity profile of the product crystals is shown in Table 2. From Table 2 it can be seen that low Al and Ca contents can be achieved due to selective cation exchange purification and applied circulation of solutions.

TABLE 2

Impurity analysis of product $LiOH \cdot H_2O$ crystals

| Al ppm | Cr ppm | Mn ppm | Ni ppm | Cu ppm | Cd ppm | Pb ppm | Be ppm | B ppm | Na ppm | Mg ppm | P ppm | K ppm | Ca ppm |
|---|---|---|---|---|---|---|---|---|---|---|---|---|---|
| <20 | <1 | <1 | <1 | <1 | <1 | <1 | <10 | <5 | <200 | <1 | <10 | <50 | <5 |

| Ti ppm | Fe ppm | Zn ppm | Bi ppm | $SO_4$ ppm | C % | $Cl^-$ % |
|---|---|---|---|---|---|---|
| <10 | <1 | <5 | <20 | <10 | <0.2 | <0.005 |

The invention claimed is:

1. A method for recovering lithium hydroxide from a mineral containing lithium, selected from spodumene, petalite or lepidolite or mixtures thereof, wherein the method comprises:
    pulping the raw material containing lithium in the presence of water and an alkali metal carbonate for producing a first slurry containing lithium,
    leaching the first slurry containing lithium in a first leaching step at an elevated temperature for producing a second slurry containing lithium carbonate,
    leaching the second slurry or a fraction thereof in a second leaching step in an aqueous solution containing an alkali earth metal hydroxide for producing a third slurry containing lithium hydroxide,
    separating the third slurry into solids and a solution containing lithium hydroxide by solid-liquid separation and purifying the obtained solution, thus providing a purified solution containing lithium hydroxide, and
    recovering lithium hydroxide monohydrate by crystallising from the purified solution containing lithium hydroxide, and
    separating the solution obtained during the crystallization from the process, and recycling it to one or more of the previous process steps, or back to the crystallization, with at least a fraction of the solution being recycled to the second leaching step.

2. The method according to claim 1, wherein the alkali metal carbonate used in the pulping step is selected from sodium and potassium carbonate.

3. The method according claim 1, wherein the first leaching step is carried out at a temperature of 160 to 250° C. and at a pressure of 10 to 30 bar.

4. The method according to claim 1, wherein the solution is separated from the solids after the first leaching step, and the solution is recycled either to the pulping step or to the first leaching step, or a fraction to each.

5. The method according to claim 1, wherein the alkali earth metal hydroxide used in the second leaching step is selected from calcium and barium hydroxide.

6. The method according to claim 1, wherein at least a fraction of the solution separated from the solids in the solid-liquid separation of the third slurry is added to said second leaching step in the form of a recycled solution, mixed with fresh alkali earth metal hydroxide prior to addition to the second leaching step, and mixed with fresh alkali earth metal hydroxide in a separate slurrying step.

7. The method according to claim 1, wherein the second leaching step is carried out at a temperature of 10-100° C. and at atmospheric pressure.

8. The method according to claim 1, wherein the step of purifying the solution obtained from the third slurry includes a purification based on the purification of dissolved ions and components, by first performing a membrane separation, and by carrying the thus purified solution to an ion exchange step, for further purification.

9. The method according to claim 1, wherein at least a fraction of the solution separated from the crystallization step is recycled to the pulping step.

10. The method according to claim 1, wherein at least a fraction of the solution separated from the crystallization step is carried to a lithium precipitation step, which is carried out as a carbonation, wherein the solution is reacted with either carbon dioxide or an alkali metal carbonate in order to form a lithium carbonate slurry.

11. The method according to claim 1, wherein the solids obtained in the crystallization step, containing crystals of lithium hydroxide monohydrate, are purified using a washing solution before recovery as the product, and the spent washing solution is separated from the purified crystals of lithium hydroxide monohydrate, and is recycled to the crystal washing step or to the step of purifying the solution separated from the third slurry or to a regeneration step preceding said purification step, or to the crystallization step, or a fraction of the spent washing solution is recycled to two or more of these steps.

12. The method according to claim 1, wherein the alkali metal carbonate used in the pulping step is at least partly composed of sodium carbonate.

13. The method according claim 1, wherein the first leaching step is carried out at a temperature of 200 to 220° C., and at a pressure of 15 to 25 bar.

14. The method according to claim 1, wherein the solution is separated from the solids after the first leaching step, and the solution is recycled at least to the pulping step.

15. The method according to claim 1, wherein the alkali earth metal hydroxide used in the second leaching step is calcium hydroxide.

16. The method according to claim 1, wherein the second leaching step is carried out at a temperature of 20-60° C., and at atmospheric pressure.

17. The method according to claim 1, wherein the second leaching step is carried out at a temperature of 20-40° C., and at atmospheric pressure.

18. The method according to claim 1, wherein the step of purifying the solution obtained from the third slurry includes a purification based on at least one of the purification of dissolved ions and components, an ion exchange, a membrane separation, or both, by first performing a membrane separation, and by carrying the thus purified solution to an ion exchange step, for further purification.

* * * * *

EX PARTE REEXAMINATION CERTIFICATE (12778th)
United States Patent
Tiihonen et al.

(10) Number: US 11,292,725 C1
(45) Certificate Issued: Nov. 27, 2024

(54) METHOD FOR RECOVERING LITHIUM HYDROXIDE

(71) Applicant: OUTOTEC (FINLAND) OY, Espoo (FI)

(72) Inventors: Marika Tiihonen, Espoo (FI); Liisa Haavanlammi, Espoo (FI); Eero Kolehmainen, Pori (FI); Sami Kinnunen, Pori (FI); Juho Savikangas, Pori (FI)

(73) Assignee: Metso Outotec Finland Oy

Reexamination Request:
No. 90/015,179, Dec. 20, 2022

Reexamination Certificate for:
Patent No.: 11,292,725
Issued: Apr. 5, 2022
Appl. No.: 16/951,066
Filed: Nov. 18, 2020

Related U.S. Application Data

(63) Continuation of application No. PCT/FI2019/050275, filed on Apr. 5, 2019.

(30) Foreign Application Priority Data

May 18, 2018 (WO) .................. PCT/FI2018/050377

(51) Int. Cl.
*C01D 15/02* (2006.01)
*B01D 61/58* (2006.01)
*B01J 39/16* (2017.01)

(52) U.S. Cl.
CPC ............ *C01D 15/02* (2013.01); *B01D 61/58* (2013.01); *B01J 39/16* (2013.01)

(58) Field of Classification Search
None
See application file for complete search history.

(56) References Cited

To view the complete listing of prior art documents cited during the proceeding for Reexamination Control Number 90/015,179, please refer to the USPTO's Patent Electronic System.

*Primary Examiner* — Alan D Diamond

(57) ABSTRACT

A method and arrangement for recovering lithium hydroxide from a mineral containing lithium, by pulping the raw material containing lithium in the presence of water and an alkali metal carbonate, leaching the obtained slurry twice, first at an elevated temperature, and secondly in an aqueous solution containing an alkali earth metal hydroxide, separating the thus obtained slurry into solids and a solution containing lithium hydroxide, the latter being purified, whereby lithium hydroxide monohydrate can be recovered from the purified solution by crystallising, and finally separating the solution obtained during the crystallization from the process and recycling it to one or more of the previous process steps.

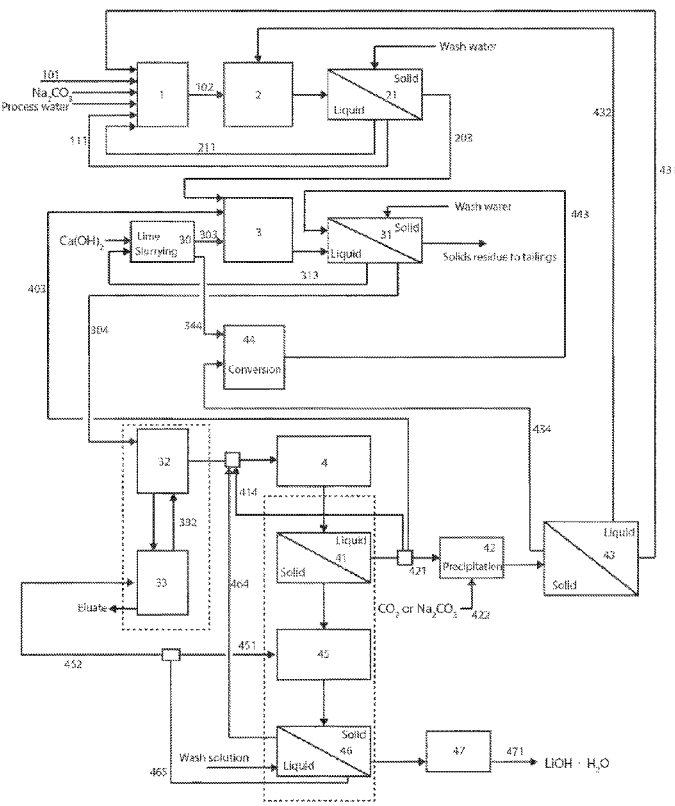

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8 and 18 is confirmed.

Claims 1-7 and 9-17 are cancelled.

New claims 19-53 are added and determined to be patentable.

*19. A method for recovering lithium hydroxide from a raw material containing lithium, selected from spodumene, petalite or lepidolite or mixtures thereof, wherein the method comprises:*

*pulping the raw material containing lithium in the presence of water and an alkali metal carbonate for producing a first slurry containing lithium;*

*leaching the first slurry containing lithium in a first leaching step at an elevated temperature for producing a second slurry containing lithium carbonate;*

*leaching at least a fraction of the second slurry in a second leaching step in a first aqueous solution containing an alkali earth metal hydroxide for producing a third slurry containing lithium hydroxide,*

*separating, in a solid-liquid separation step using a solid-liquid separation unit, the third slurry into solids and a second aqueous solution containing lithium hydroxide*

*purifying, in a purifying step that removes dissolved impurities using a purification unit, the second aqueous solution, thus providing a purified solution containing lithium hydroxide and at least some amount of dissolved impurities,*

*crystallizing, in a crystallizing step using a crystallization unit, the purified solution containing lithium hydroxide to recover lithium hydroxide monohydrate, wherein a third aqueous solution containing at least some amount of dissolved impurities is obtained during the crystallizing step; and*

*recycling the third aqueous solution to one of the previous steps, with at least a fraction of the third aqueous solution being recycled to the second leaching step, wherein the recycling of the third aqueous solution to the second leaching step results in lithium hydroxide with fewer impurities.*

*20. The method according to claim 19, wherein the purifying step is performed by ion exchange.*

*21. The method according to claim 19, wherein the purifying step is performed using a cation exchange resin.*

*22. The method according to claim 21, wherein the purifying step is performed using a selective cation exchange resin.*

*23. The method according to claim 19, wherein the purifying step is performed using an iminodiacetic acid chelating cation exchange resin.*

*24. The method according to claim 19, wherein the purifying step is performed using an aminophosphonic acid chelating cation exchange resin.*

*25. The method according to claim 19, wherein the purifying step is performed by a membrane separation.*

*26. The method according to claim 19, wherein the purifying step is performed by a membrane separation and then an ion exchange.*

*27. The method according to claim 19, wherein the first leaching step is carried out at a temperature of 160 to 250° C. and at a pressure of 10 to 30 bar.*

*28. The method according to claim 26, wherein the first leaching step is carried out at a temperature of 200 to 220° C. and at a pressure of 15 to 25 bar.*

*29. The method according to claim 19, wherein the solid-liquid separation unit is distinct from the purification step.*

*30. The method according to claim 19, wherein the purification unit is distinct from the crystallization step.*

*31. The method according to claim 19, wherein the purification unit is a membrane separation unit.*

*32. The method according to claim 19, wherein the purification unit is an ion exchange unit.*

*33. The method according to claim 19, wherein the purification unit is a membrane separation unit and an ion exchange unit.*

*34. The method according to claim 19, wherein the dissolved impurities are dissolved ion impurities.*

*35. The method according to claim 19, wherein the first slurry does not contain an acid.*

*36. The method according to claim 19, wherein the first slurry is substantially sulphate free.*

*37. The method according to claim 19, wherein the third slurry does not contain an acid.*

*38. The method according to claim 19, wherein the third slurry is substantially sulphate free.*

*39. The method according to claim 19, wherein the alkali metal carbonate used in the pulping step is selected from sodium and potassium carbonate.*

*40. The method according to claim 19, wherein the second slurry is separated into obtained second solids and obtained second solution and at least a fraction of the obtained second solution is recycled to the pulping step.*

*41. The method according to claim 19, wherein the alkali earth metal hydroxide used in the second leaching step is selected from calcium and barium hydroxide.*

*42. The method according to claim 19, wherein the third aqueous solution, before being recycled to the second leaching step, is mixed with an alkali earth metal hydroxide in a separate slurrying step.*

*43. The method according to claim 19, wherein the second leaching step is carried out at a temperature of 10-100° C. and at atmospheric pressure.*

*44. The method according to claim 19, wherein the purifying step includes use of a membrane and then use of an ion exchange.*

*45. The method according to claim 19, wherein at least a fraction of the third aqueous solution is recycled to the pulping step.*

*46. The method according to claim 19, wherein at least a fraction of the third aqueous solution is used in a lithium precipitation step, wherein the third aqueous solution is reacted with at least one of a carbon dioxide or an alkali metal carbonate in order to form a lithium carbonate slurry.*

*47. The method according to claim 19, wherein the solids obtained in the crystallization step are subject to a washing solution in a washing step, and where used washing solution is separated from the recovered lithium hydroxide monohydrate and at least a fraction of the used washing solution is* recycled to at least one of the washing step, the purifying step, the crystallization step, or a regeneration step preceding the purifying step.

48. The method according to claim 19, wherein the alkali metal carbonate used in the pulping step is at least partly composed of sodium carbonate.

49. The method according to claim 19, wherein the second slurry is separated into obtained second solids and obtained second solution and at least a fraction of the obtained second solution is recycled to the pulping step.

50. The method according to claim 19, wherein the alkali earth metal hydroxide used in the second leaching step is calcium hydroxide.

51. The method according to claim 19, wherein the second leaching step is carried out at a temperature of 20-60° C., and at atmospheric pressure.

52. The method according to claim 19, wherein the second leaching step is carried out at a temperature of 20-40° C., and at atmospheric pressure.

53. The method according to claim 19. wherein the purifying step includes purifying by use of at least one of an ion exchange or a membrane.

\* \* \* \* \*